United States Patent [19]
Itoh

[11] Patent Number: 5,325,663
[45] Date of Patent: Jul. 5, 1994

[54] DIAGNOSTIC SYSTEM FOR A SECONDARY AIR SUPPLIER IN AN ENGINE

[75] Inventor: Tokiji Itoh, Toyota, Japan

[73] Assignee: Toyota Jidosha Kabushiki Kaisha, Aichi, Japan

[21] Appl. No.: 42,317

[22] Filed: Apr. 2, 1993

[30] Foreign Application Priority Data

Apr. 27, 1992 [JP] Japan .................................. 4-108009

[51] Int. Cl.$^5$ .............................................. F01N 3/20
[52] U.S. Cl. ........................................ 60/274; 60/276; 60/277; 60/289
[58] Field of Search .................. 60/274, 276, 277, 289

[56] References Cited

U.S. PATENT DOCUMENTS

| | | | |
|---|---|---|---|
| 5,060,474 | 10/1991 | Aramaki | 60/277 |
| 5,113,651 | 5/1992 | Kotzan | 60/274 |
| 5,119,631 | 6/1992 | Kayanuma et al. | 60/274 |
| 5,140,810 | 8/1992 | Kuroda | 60/274 |

FOREIGN PATENT DOCUMENTS 63-143362  6/1988  Japan .

Primary Examiner—Douglas Hart
Attorney, Agent, or Firm—Kenyon & Kenyon

[57] ABSTRACT

An engine controller executes the feedback control of an amount of the fuel injected, such that an air-fuel ratio (A/F) of the exhaust gas approaches a theoretical ratio. The amount of the fuel injected is as a function of a changeable feedback correction factor (FAF). When the engine is in a predetermined condition in which the engine controller interrupts the feedback control, a secondary air supplier supplies secondary air from an intake passage to an exhaust passage, and changes the A/F ratio of the exhaust gas. Furthermore, when the engine controller executes the feedback control operation, the secondary air is temporarily supplied to the exhaust passage, for the purpose of diagnosis of the supplier. The diagnostic system detects a first feedback correction factor before the secondary air is supplied, and a second feedback correction factor after the secondary air has been supplied, and calculates a deviation value therebetween. The system determines that the secondary air supplier is malfunctioning, when the deviation value (ΔFAF) is smaller than a predetermined value (α).

6 Claims, 6 Drawing Sheets

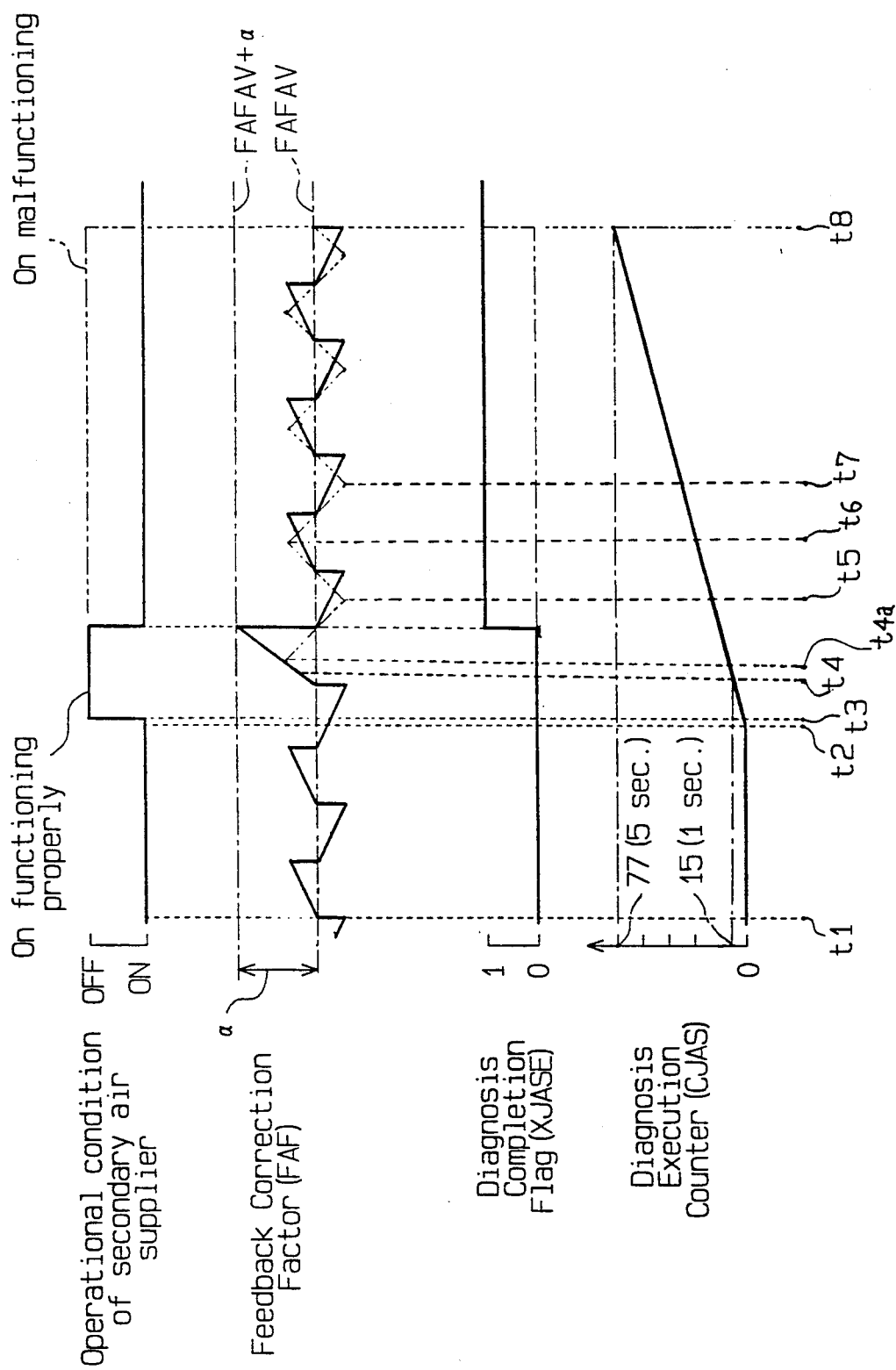

DIAGNOSTIC SYSTEM FOR A SECONDARY AIR SUPPLIER IN AN ENGINE

BACKGROUND OF THE INVENTION

1. Field of the Invention

The present invention generally relates to a secondary air supplier for use in a vehicular engine. More particularly, the present invention pertains to a diagnostic system for diagnosing the condition of the secondary air supplier. The air supplier supplies secondary air to an exhaust passage of the engine, in order to purify the exhaust gas.

2. Description of the Related Art

Conventional exhaust gas purification techniques generally utilize an oxygen sensor and a three way catalytic converter, in order to satisfy two requirements. The first requirement is to satisfy the regulatory rules, and the other requirement is to minimize the engine fuel consumption. These conventional techniques include oxidizing and/or deoxidizing the carbon monoxide (CO), hydro-carbon (HC) and nitrogen oxides (NOx), contained in the exhaust gas, in order to purify it. In order to efficiently complete these reactions, the air-fuel ratio in the engine should be maintained at about a theoretical air-fuel ratio. The concept for maintaining the theoretical air-fuel ratio has been embodied in several engine systems.

An exemplary engine system of this type includes an engine control unit, an oxygen sensor disposed along an exhaust passage, and a secondary air supplier for directly supplying the secondary air from an intake passage to the exhaust passage. The control unit calculates the air-fuel ratio (A/F) of the air-fuel mixture in the engine cylinders based on the output signal from the oxygen sensor. Further, the control unit executes a closed loop control operation (i.e., feedback control operation) for controlling the supplied amount of air and/or fuel. As a result of this control, the air-fuel ratio approaches the theoretical air-fuel ratio.

In order to execute the above-described closed loop control operation, a feedback correction factor (FAF) is utilized for calculating a target supplied amount of air and/or fuel. The feedback correction factor (FAF) could vary in relation to the detected result of an oxygen sensor. While the air-fuel ratio (A/F) is controlled to approach the theoretical air-fuel ratio, the feedback correction factor (FAF) alters, where the value "1.0" is the center of variation.

When the engine is operating under specific conditions, the secondary air is supplied to the exhaust passage by means of the secondary air supplier, in order to warm up the catalyst (i.e., in order to activate the catalyst).

The following are illustrative specific operation conditions of the engine: a condition wherein the coolant temperature is still cold; and a condition wherein. The control unit executes an open loop control operation for the air-fuel ratio (A/F), while the secondary air is being supplied. The control unit re-executes the closed loop control operation for the air-fuel ratio simultaneously with the termination of the secondary air supply.

In this conventional engine system, the exhaust emission could become faulty when the secondary air supplier malfunctions.

The Japanese Unexamined Patent Publication No. 63-143362 proposes a diagnostic system for diagnosing whether or not the secondary air supplier is functioning properly. In this system, the secondary air supplier is forcibly activated when the closed loop control operation for controlling the amount of fuel injected is executed. The secondary air is supplied to the exhaust passage by means of the secondary air supplier. Further, a mean value of the feedback correction factor (FAF) will be calculated. When the calculated mean value becomes smaller than a fundamental value ("1.0") for a predetermined period of time, the diagnostic system determines that the secondary air supplier is malfunctioning.

However, in the engine system which is executing the closed loop control operation for the amount of fuel injected, when the engine is operating in a constant speed condition, the feedback correction factor (FAF) approaches the fundamental value "1.0". When a vehicle is varying its engine condition (e.g. decelerating), the feedback correction factor (FAF) might largely shift away from the fundamental value "1.0".

In other words, the amount of fuel injected by the fuel injector is calculated in the following way: a fundamental amount of fuel injected is determined by taking a ratio (intake amount/engine speed), and is adjusted by the feedback correction factor (FAF), which is determined in relation to the result detected by the oxygen sensor. The amount of the air intake is a value measured by an air flowmeter. Accuracy of measurement by this air flowmeter tends to vary specifically, when the amount of air intake is decreased in response to a change of operating conditions of the engine, from the constant speed operating condition to the decelerating condition. Therefore, while the vehicle is decelerating, the feedback correction factor (FAF) might largely shift away from the fundamental value "1.0".

Therefore, if the secondary air is supplied while the feedback correction factor temporarily and largely shifts away from the fundamental value "1.0", the mean value of the feedback correction factor, for use in a diagnostic operation, might become smaller than the predetermined value for a predetermined period of time. According to the conventional technology which simply compares the mean value of the feedback correction factor (FAF) with the predetermined value, the diagnostic system might erroneously determine that the secondary air supplier is malfunctioning, even when the secondary air supplier is properly functioning.

SUMMARY OF THE INVENTION

Accordingly, it is a primary object of the present invention to provide a diagnostic system for a secondary air supplier which accurately diagnoses the condition of the secondary air supplier even when a feedback correction factor temporarily and largely shifts away from a fundamental value.

To achieve the foregoing and other objects, and in accordance with the purpose of the present invention, an improved diagnostic system is provided for use in a secondary air supplier for an engine.

The present invention is directed to an engine including a cylinder, an intake passage, an exhaust passage, an injector for injecting fuel into the cylinder or the intake passage, a sensor for detecting an air-fuel ratio (A/F) of the exhaust gas within the exhaust passage and an engine controller. The engine controller executes the feedback control of an amount of the injected fuel by the injector in such a way that the air-fuel ratio (A/F) approaches a theoretical air-fuel ratio. The amount of the fuel injected is as a function of a changeable feedback correction factor (FAF). Further, the engine controller is equipped with a memory unit for changing and storing the value of the feedback correction factor (FAF).

A secondary air supplier for use in conjunction with the present invention includes an air supply unit, a detection unit, and a control unit. The air supply unit supplies secondary air from the intake passage to the exhaust passage, and mixes with existing exhaust gas, in order to change the air-fuel ratio of the exhaust gas. The detection unit detects a condition of the engine. The control unit controls the air supply unit in accordance with the engine condition, whereby the secondary air is supplied to the exhaust passage by means of the air supply unit, when the engine is in a predetermined condition in which the engine controller interrupts the feedback control of the amount of the fuel injected.

The diagnostic system includes a con, hands unit for instructing the secondary air supplier to temporarily supply air to the exhaust passage, when the engine controller executes the feedback control of the amount of the fuel injected. A diagnostic system according to the present invention further includes a sampling unit, a calculation unit, and diagnostic unit.

The sampling unit samples the changeable feedback correction factor (FAF) from the memory unit, and detects a first feedback correction factor before the secondary air is supplied based on the instruction of the command unit, and a second feedback correction factor after the secondary air has been supplied. The calculation unit calculates a deviation value ($\Delta$FAF) between the first and the second feedback correction factors. The diagnostic unit determines that the secondary air supplier is malfunctioning when the calculated deviation value ($\Delta$FAF) is smaller than a predetermined value ($\alpha$).

BRIEF DESCRIPTION OF THE DRAWINGS

The features of the present invention that are believed to be novel are set forth with particularity in the appended claims. The invention, together with the objects and advantages thereof, could best be understood by reference to the following description of the preferred embodiments, together with the accompanying drawings, in which FIGS. 1 through 6 illustrate a first embodiment according to the present invention, for use in a vehicle.

FIG. 1 is a schematic plan view illustrating a vehicle engine system, which includes a secondary air supplier;

FIG. 2 is a block diagram illustrating an electronic control unit (ECU) and its peripheral devices;

FIG. 3 is a graph illustrating the relationship between time and each of the following factors: output voltage (Vd) from a oxygen sensor; and a feedback correction factor (FAF);

FIGS. 4 and 5 are flowcharts illustrating a main diagnostic routine executed by a central processing unit (CPU); and FIG. 6 is a timing chart illustrating the relationship between time and each of the following factors: operational condition of a secondary air supplier; feedback correction factor (FAF); diagnosis completion flag (XJASE); and diagnosis execution counter (CJAS).

DETAILED DESCRIPTION OF THE PREFERRED EMBODIMENT

A preferred embodiment according to the present invention will now be described referring to FIGS. 1 through 6.

Figure 1:
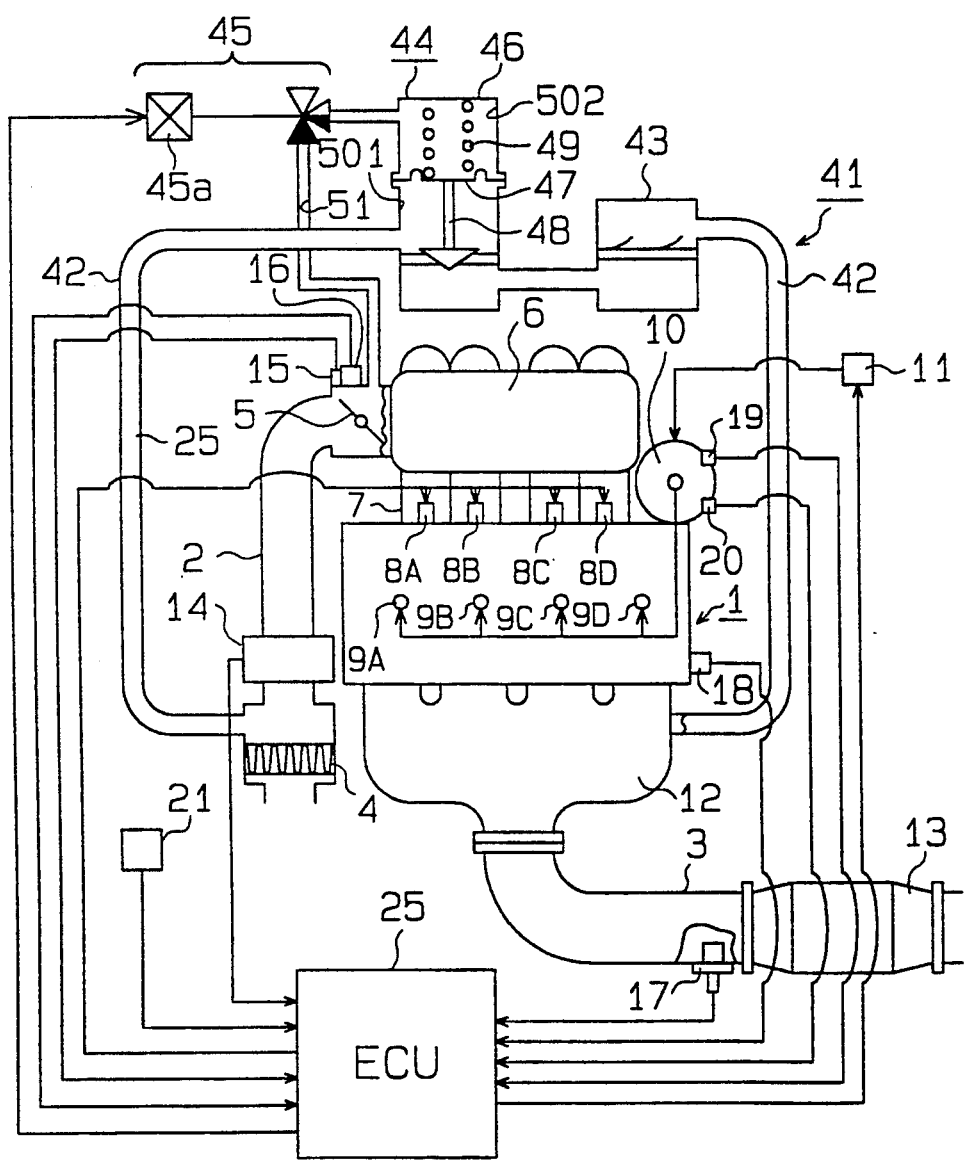

As shown in FIG. 1, an gasoline engine 1 includes four cylinders, and is mounted in a vehicle. Each cylinder bore in the engine 1 has a combustion chamber (not shown). An intake passage 2 and an exhaust passage 3 communicate with the combustion cheers. The intake passage 2 includes an air cleaner or filter 4, a throttle valve 5, a surge tank 6, and intake manifolds 7, which are sequentially disposed along the intake passage 2, from the down side side to the engine cylinder block. Fresh air is introduced to the engine 1, via the filter 4, valve 5, tank 6 and intake manifolds 7.

The inclination angle of the throttle valve 5 is controlled in relation to the thrusting angle or force applied on an accelerator pedal (not shown). The amount of air supplied through the passage 2 is adjusted according to the inclination angle. Further, the tank 6 eliminates the pulsation generated in the air steam flowing through the passage 2, so as to make the air stream flow smoothly.

A plurality of fuel injectors 8A, 8B, 8C and 8D are provided in the intake manifolds 7, to supply fuel to each one of the corresponding cylinders. Fuel is injected from each one of the injectors 8A through 8D, simultaneously with the air introduced into the passage 2. The air-fuel mixture is supplied to each one of the combustion chambers.

The engine 1 is provided with ignition plugs 9A, 9B, 9C and 9D, for igniting the air-fuel mixture supplied to the corresponding combustion chambers. Each ignition plug is activated, based on an ignition signal from a distributor 10. The distributor 10 distributes a high voltage signal from an ignitor 11 to the ignition plugs 9A through 9D, synchronously with a crank angle of the engine 1. The individual ignition plug provides a Spark to cause the mixture within the corresponding chamber to burn explosively, and to generate engine power. The exhaust gas in the chambers is discharged through the exhaust passage 3.

The exhaust passage 3 includes exhaust manifolds 12 and a catalytic converter 13, which are serially disposed along the passage 3. The catalytic converter 13 purifies the hydrocarbon (HC), carbon monoxide (CO) and nitrogen oxide (NOx) in a exhaust gas, by means of a catalyst contained therein.

An air flowmeter 14, a valve switch 15, a throttle sensor 16, an oxygen sensor 17, a coolant temperature sensor 18, an engine speed sensor 19, a timing sensor 20, and a vehicle speed sensor 21, are provided for detecting the operating condition of the engine 1. The air flowmeter 14 is disposed downstream from the air cleaner 4, to determine the amount of air (i.e., intake amount Q) which is supplied to the engine 1. The throttle sensor 16 is disposed in the vicinity of the throttle valve 5, and detects an opening angle (TA) of the throttle valve 5. The valve switch 15 is also disposed in the vicinity of the throttle valve 5. The switch 15 is turned on, when the throttle valve 5 completely closes the passage 2, whereupon the switch 15 transmits a signal indicative of the complete closure of the passage 2 (hereinafter, the signal will be to refer as "completely closed signal (LL)").

The oxygen sensor 17 is disposed between the exhaust manifolds 12 and the catalytic converter 13. The oxygen sensor 17 detects the residual oxygen density within the exhaust gas. In other words, it detects the air-fuel ratio (A/F) of the exhaust gas within the exhaust passage 3. The coolant temperature sensor 18 is provided on a water outlet housing which forms an outlet of the housing of the engine 1 for the coolant. The sensor 18 detects the temperature (THW) of the engine coolant. The engine speed sensor 19 detects the number of revolutions of the engine 1 per unit of time (i.e., engine speed (NE)), based on the number of revolutions of a rotor (not shown) disposed within the distributor 10.

The timing sensor 20 detects a displacement of the crank angle of the engine 1, every at a predetermined interval, in accordance with the rotation of the rotor of the distributor 10. The vehicle speed sensor 21 is disposed on a transmission mechanism (not shown) that is operatively connected to the engine 1. The sensor 21 detects the vehicle speed (SPD).

In addition, the engine 1 is provided with a secondary air supplier 41, for feeding air into the exhaust passage 3. The secondary air supplier 41 is an air suction type supplier which utilizes exhaust gas pulsation within the exhaust passage 3 in order to directly intake air from the intake passage 2. The supplier 41 includes a passage or path 42, a check valve 43, an air switching valve 44 (hereinafter, referred to as "ASV 44"), and a vacuum switching valve 45 (hereinafter, referred to as "VSV 45"). One end of the passage 42 is connected midway between the air cleaner 4 and the air flowmeter 14. The other end of the passage 42 is connected to the exhaust manifolds 12, between the oxygen sensor 17 and the engine cylinder block. The intake passage 2 and the exhaust passage 3 communicate with each other, via the passage 42. In other words, part of the air within the intake passage 2 is fed into the exhaust manifolde 12, as the secondary air, via the passage 42. The check valve 43 prevents the air from flowing in the reverse direction, towards the intake passage 2 from the exhaust passage 3.

As illustrated in FIG. 1, the ASV 44 includes a casing 46 and a diaphragm 47 stretched across the internal portion of the casing 46. The diaphragm 47 divides the casing 46 into two internal chambers, a first chamber 501 and a second chamber 502. The ASV 44 further includes a movable valve piece 48 which is connected to the diaphragm 47 within the first chamber 501, and a coil spring 49 which is disposed within the second chamber 502. The valve piece 48 opens and closes the passage 42. The spring 49 urges the valve piece 48 in the downward direction, for causing the valve piece 48 to close the passage 42.

The second chamber 502 communicates with the intake passage 2, via a lead passage 51, which branches from the connecting passage between the throttle valve 5 and the surge tank 6. When the internal pressure in the second chamber 502 decreases, the valve piece 48 permits the passage 42 to be opened. The VSV 45 is disposed midway along the lead passage 51, and controls the internal pressure of the second chamber 502.

The VSV 45 includes a solenoid 45a which is controlled by the ECU 25. When the solenoid 45a is energized in response to the signal transmitted from the ECU 25, the lead passage 51 is opened, allowing field communication between the second chamber 502 and the intake passage 2. Consequently, the internal pressure of the second chamber 502 decreases due to the downstream suction. As a result, the diaphragm 47 is bent upwardly against the biasing force of the spring 49, so that the valve piece 48 is shifted from a position where it closes the passage 42, to a position where it permits the secondary air to flow along the passage 42. Consequently, the air in the intake passage 2 is supplied to the exhaust manifolds 12.

On the other hand, when the solenoid 45a is no longer energized, the VSV 45 shuts off the passage between the second chamber 502 and the intake passage 2, and also lets the second chamber 502 communicate with the atmospheric air. The valve piece 48 is returned to the position where the spring 49 causes the passage 42 to close. Thus, the secondary air is no longer supplied to the exhaust manifolds 12.

The air supplied by the secondary air supplier is utilized to burn the residual gasoline within the exhaust gas, in order to generate heat. Heat causes the catalysts to warm up, resulting in the activation of the catalysts. In other words, heat improves the efficiency of the exhaust purification process.

Figure 2:
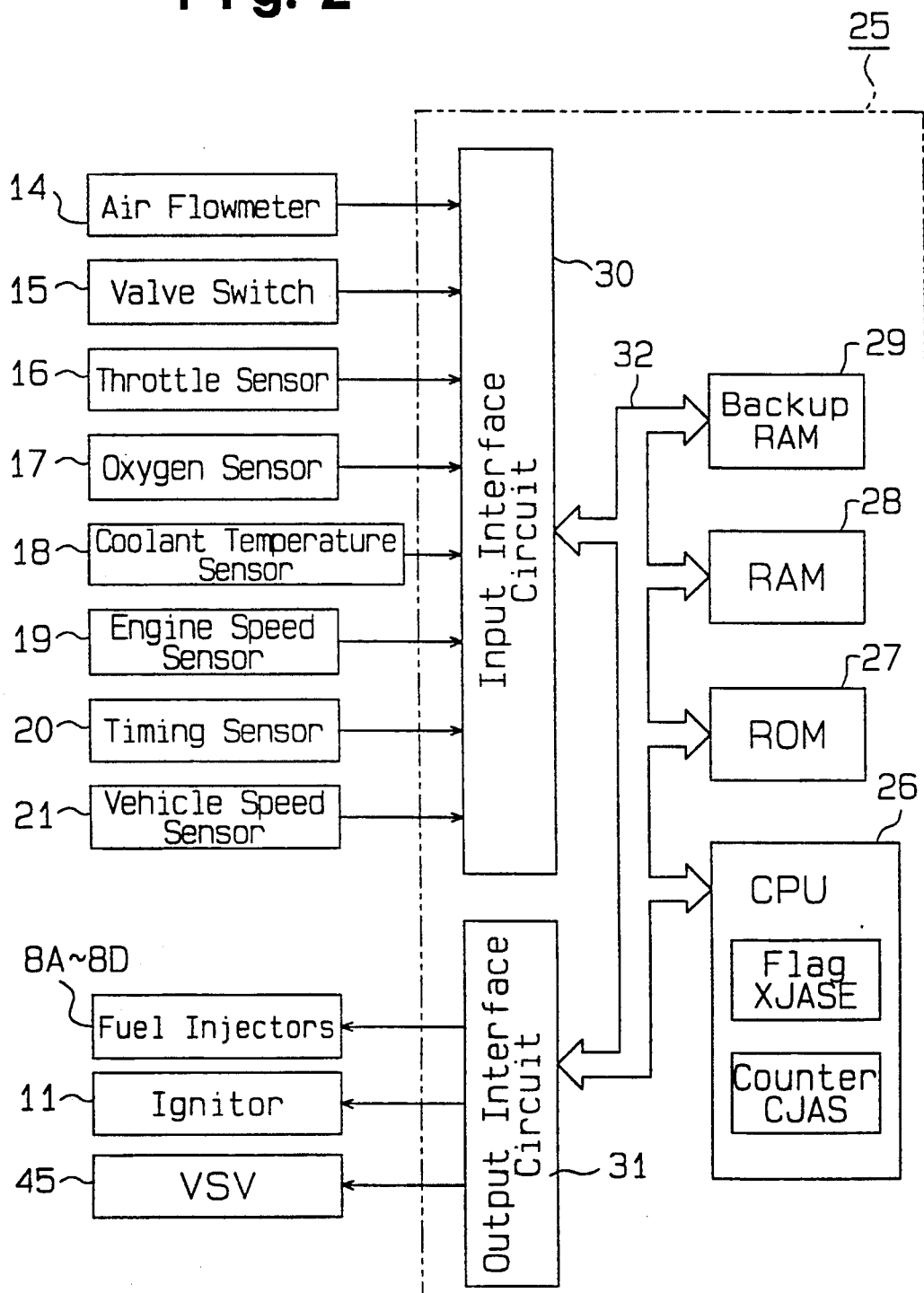

The engine system, according to this embodiment, includes an electric control unit (ECU) 25 for totally controlling the engine 1 and its related devices. As shown in FIG. 2, the ECU 25 includes a central processing unit (CPU) 26, a read only memory (ROM) 27, a random access memory (RAM) 28, a backup RAM 29, an input interface circuit 30, an output interface circuit 31, and buses 32 which mutually interconnect these devices. The CPU 26 executes various operations corresponding to the prepared control programs. The ROM 27 stores the control programs and initial data, which are necessary for the CPU 26 to execute the operations. The RAM 28 temporarily stores a result calculated by the CPU 26. The backup RAM29 is powered by a battery (not shown), and backs up the various data to be stored, even when the main power is cut off.

The input interface circuit 30 is connected to the air flowmeter 14, the valve switch 15, the throttle sensor 16, the oxygen sensor 17, the coolant temperature sensor 18, the engine speed sensor 19, the timing sensor 20 and the vehicle speed sensor 21. The output interface circuit 31 is connected to the fuel injectors 8A through 8D, the ignitor 11 and the VSV 45. The CPU 26 receives the output signals transmitted from the air flowmeter 14, the switch 15 and the sensors 16 through 21, as input data, via the input interface circuit 30. The CPU 26 controls the fuel injectors 8A through 8D, the ignitor 11 and the VSV 45, via the output interface circuit 31, based on the input data.

The function of the CPU 26 will be now explained in more detail. Based on the detected signals from the throttle sensor 16, the temperature sensor 18 and the speed sensor 21, the CPU 26 determines whether or not the engine 1 is in the condition which is required to execute the feedback control of the air-fuel ratio (A/F). If the engine 1 is in such a condition, the CPU 26 receives the signal from the oxygen sensor 17, and determines the A/F ratio. The CPU 26 adjusts the amount of fuel injected from the fuel injectors 8A through 8D, such that the A/F ratio becomes close to a theoretical air-fuel ratio. The CPU 26 calculates the target value of the fuel injection time period (hereinafter, the target value is referred as "target injection period (TAU)"), based on the following equation (0):

$$TAU = K \cdot (Q/NE) \cdot FAF \qquad (0)$$

In the foregoing equation (0), "K" is a constant value, "Q" is an intake amount, "NE" is a engine speed, "K·(Q/NE)" is a standard value of the fuel injection period, for obtaining the theoretical air-fuel ratio, and "FAF" is a feedback correction factor, which varies in accordance with the output signal transmitted from the oxygen sensor 17. The TAU is corrected by the FAF, such that the (A/F) ratio approaches the theoretical air-fuel ratio.

Figure 3:
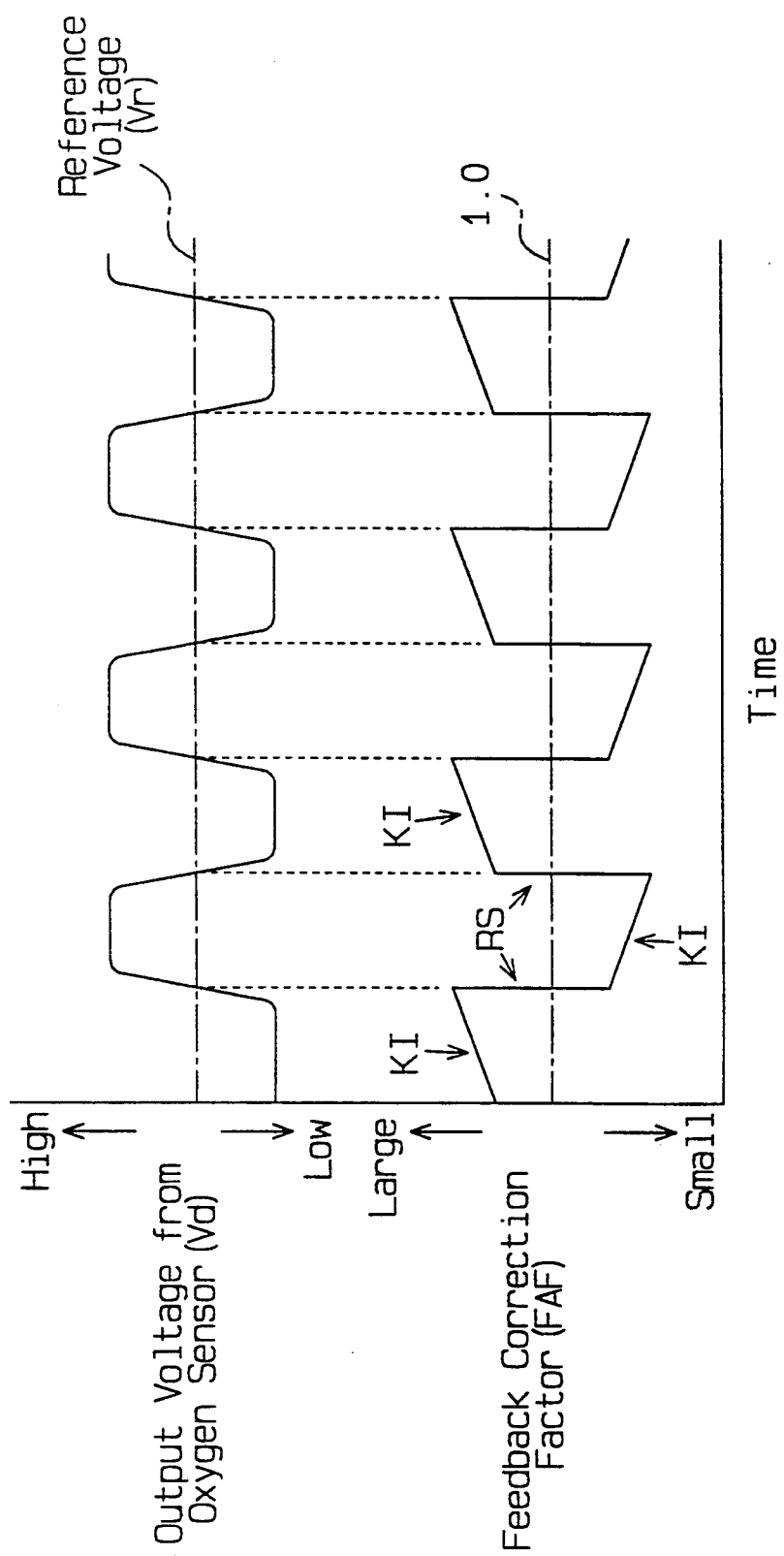

The CPU 26 calculates the feedback correction factor (FAF) as in following description. As shown in FIG. 3, the CPU 26 compares the output voltage (Vd) from the oxygen sensor 17, to the reference voltage (Vr), that corresponds to the theoretical air-fuel ratio. If the output voltage (Vd) is higher than the reference voltage (Vr), the CPU 26 determines that the A/F ratio indicates a rich condition, in which fuel is excessively supplied in comparison with the theoretical air-fuel ratio. If the output voltage (Vd) is lower than the reference voltage (Vd), the CPU 26 determines that the A/F ratio indicates a lean condition, in which air is excessively supplied in comparison with the theoretical air-fuel ratio. When the A/F ratio indicates a rich condition, the CPU 26 compares the present A/F ratio to the previous A/F ratio. Then, the CPU 26 determines whether or not the A/F ratio indicates a change from the lean condition to the rich condition. If the A/F ratio indicates such a change to the rich condition, the value of (FAF−RS) is set as the new feedback correction factor (FAF). "RS" is the skipping amount. When the indication of the A/F ratio is determined to indicate the lean condition, the value of (FAF−KI) is set as the new feedback correction factor (FAF). "KI" is an integral capacity for PID feedback control operation. The value of RS is much greater than that of KI (RS>>KI).

When the signal transmitted from the oxygen sensor 17 indicates a lean condition, the CPU 26 compares the present A/F ratio to the previous A/F ratio. Then, the CPU 26 determines whether or not the A/F ratio indicates a change from the rich condition to the lean condition. When the A/F ratio indicates such a change to the lean condition, the CPU 26 sets the value of (FAF+RS) as the new feedback correction factor (FAF). When the A/F ratio is determined to indicate the rich condition, the CPU 26 sets the value of (FAF+KI) as the new feedback correction factor (FAF).

Therefore, when the A/F ratio indicates changes between the rich and lean conditions, the CPU 26 varies or skips the feedback correction factor (FAF) at a step rate, in order to regulate the amount of injected fuel. While the A/F ratio does not indicate a change in the rich or lean condition, the CPU 26 continuously and gradually varies the feedback correction factor (FAF) to correspond to the existing condition. When the A/F ratio is controlled to approach the theoretical air-fuel ratio, the feedback correction factor (FAF) is varied such that the average value of FAF is 1.0.

In addition, the CPU 26 calculates a mean value (FAFAV) of the feedback correction factor. For example, every time the indication of the A/F ratio changes between the rich and lean conditions, and when the feedback correction factor is changed by the skipping amount (RS), the CPU 26 calculates the mean value between the feedback correction factor (FAF) just before skipping, and the previous factor (FAF) just before skipping. The FAFAV can be calculated by taking the mean value of the last few feedback correction factors (FAF), just before skipping.

After the CPU 26 calculates the target injection period (TAU) according to the above equation (0), the CPU 26 outputs signals reflective of the value of the TAU, to the fuel injectors 8A through 8D. These output signals determine the fuel injection period of each individual injector, and thus regulate the amount of fuel to be injected. The feedback control is achieved in this manner, so that the A/F ratio approaches the theoretical air-fuel ratio.

The CPU 26 determines whether or not the engine 1 is in a specific condition where the secondary air supplier 41 should be activated based on the output signals from the throttle sensor 16, the valve switch 15, the coolant temperature sensor 18, the vehicle speed sensor 21 and other devices. When the CPU 26 determines that the engine 1 is in such a condition, the CPU 26 transmits a drive signal to the solenoid 45a, in order to energize the solenoid 45a. The secondary air supplier 41 is activated based on the energization of the solenoid 45a, to supply the secondary air to the exhaust manifolds 12. The following are illustrative specific conditions of the engine under which the secondary air supplier 41 may be activated:

(i) the coolant temperature (THW) is at most 50° C. and the throttle angle (TA) indicates that the throttle is not fully-opened ( i. e. , warming-up condition ); or (ii) the completely closed signal (LL) is in ON status, and the vehicle speed (SPD) is at least "4 km/hr" (decelerating condition).

Figure 4:
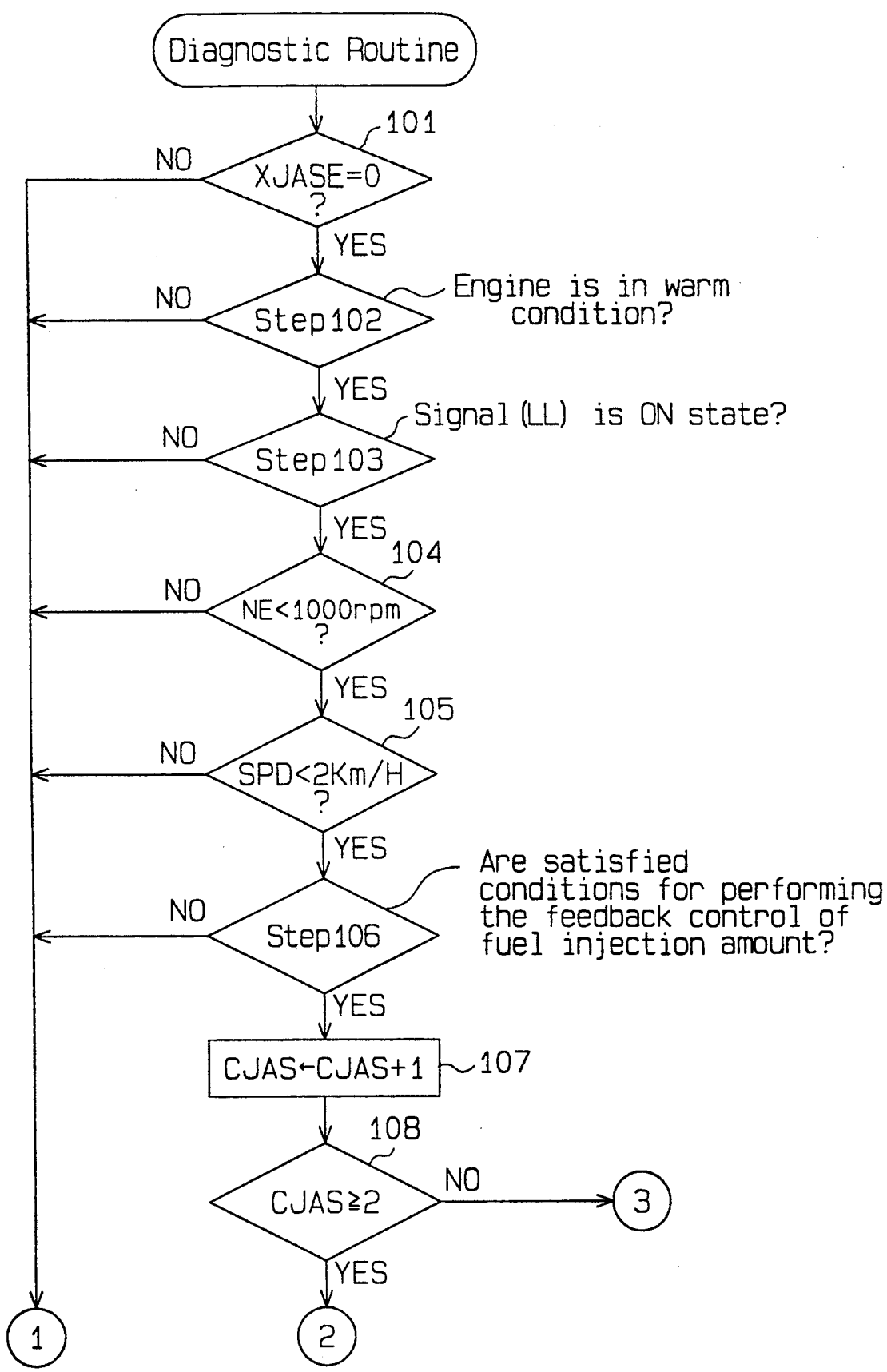
Figure 5:
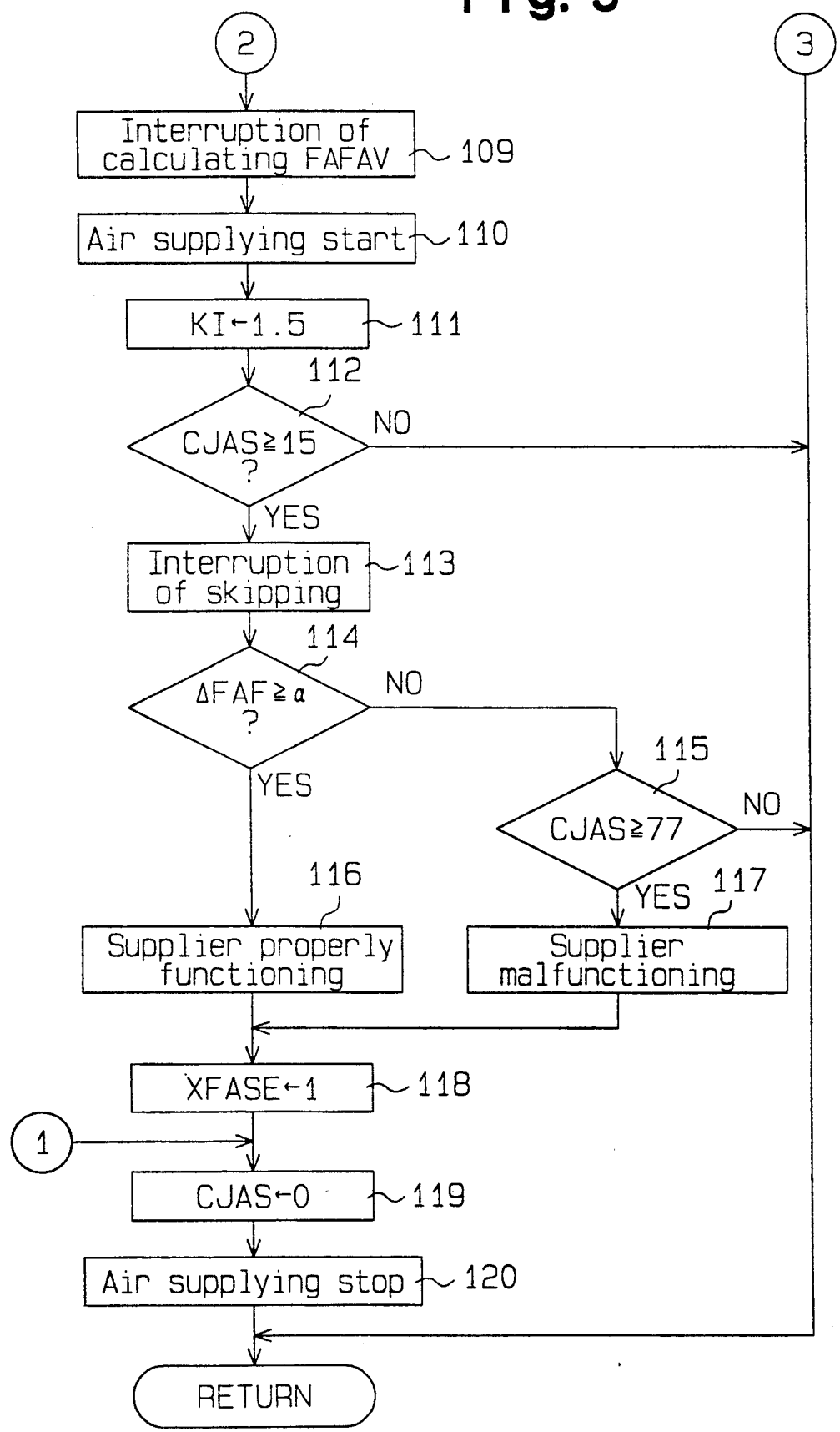

Next, the operations and functions of this embodiment will be described. The flowcharts in FIGS. 4 and 5 show the main routine executed by the CPU 26, for the purpose of diagnosing the condition of the secondary air supplier 41. The diagnostic operation following the main routine is performed in response to an interruption request, which is periodically received by the CPU 26, at a predetermined time interval (0.065 seconds in this embodiment).

A diagnosis completion flag (XJASE) is provided for the diagnostic operation. The flag (XJASE) indicates whether or not the diagnosis of the secondary air supplier 41 has been done previously. The flag (XJASE) will be set to "0" by an engine initialize routine, which is executed at the time when an ignition switch (not shown) is turned on. Further, the flag (XJASE) will be set to "1", after the completion of the diagnosis of the secondary air supplier 41.

As the CPU 26 shifts its execution to the main routine without previously performing a diagnostic operation for the secondary air supplier 41 at t1 (FIG. 6), the CPU 26 determines whether or not the flag (XJASE) is set to "0" (step 101). At t1, the flag (XJASE) is "0". Therefore, the CPU 26 determines that the diagnostic operation for the secondary air supplier 41 has not been yet executed, such that the CPU 26 executes steps 102 through 106. The operations of steps 102 through 106 are for determining whether or not the engine 1 is in a condition in which it is suitable to diagnose the secondary air supplier 41.

The CPU 26 determines whether or not the coolant temperature (THW) detected by the coolant temperature sensor 18 is in a predetermined range of temperature, between 80° C.≦THW≦100° C. In other words, the CPU determines whether or not the engine 1 is in a warm condition (step 102). Then, the CPU 26 determines whether or not the signal (LL) from the valve switch 15 is in ON status (step 103). Further, the CPU 26 determines whether or not the engine speed (NE) from the engine speed sensor 19 is less than the predetermined value (in this embodiment, the value is 1000 rpm) (step 104). Furthermore, the CPU 26 determines whether or not the vehicle speed (SPD) from the vehicle speed sensor 21 is less than the predetermined value (i.e. 2 km/hr in this embodiment) (step 105).

The CPU 26 determines whether or not the conditions for performing the feedback control of the amount of fuel injected are satisfied (step 106). The following are illustrative specific conditions for executing the feedback control: the time interval for sampling the signal output from the oxygen sensor 17 is shorter than the predetermined time interval. The stop condition of the secondary air supplier 41 is excluded from the above-described conditions. If the stop condition of the secondary air supplier 41 is included, the feedback control for the amount of fuel injected is interrupted, while the secondary air is still being supplied, such that the diagnostic routine can not be executed hereafter.

When all the conditions of steps 102 through 106 are not satisfied, the CPU 26 sets a value in a diagnosis execution counter (CJAS), to "0" (step 119 in FIG. 5). The diagnosis execution counter (CJAS) is one of internal accumulators of the CPU 26. The counter (CJAS) measures the time from the start until the end of the diagnostic operation in order to control the operational timing of the secondary air supplier 41 during the diagnostic period and the timing of changing the feedback correction factor (FAF). The CPU 26 then outputs a signal to de-energize the solenoid 45a of the VSV 45 (step 120), and terminates the main routine. When the solenoid 45a is de-energized, the second chamber 502 is put in fluid communication with the atmospheric air, and the valve piece 48 of the ASV 44 is positioned in the closed position. Therefore, the passage 42 is cut off, such that the secondary air is no longer led into the exhaust manifolds 12. Then, the feedback control for the A/F ratio utilizing a feedback correction factor (FAF) starts to be executed.

When all the conditions of steps 102 through 106 in FIG. 4 are satisfied (at t2 in FIG. 6), the CPU 26 determines that the engine 1 is in a suitable condition for the diagnostic operation. Then, the CPU 26 executes the operations starting from step 107. The CPU 26 increases the value in the diagnosis execution counter (CJAS) by "1" (step 107). In this case, the value in the counter (CJAS) switches its state from "0" to "1". The switching time for the counter (CJAS), to switch its state from "0" to "1", is approximately 0.065 seconds.

The CPU 26 then determines whether or not the value in the counter (CJAS) is at least "2" (step 108). In other words, the CPU 26 determines whether or not 0.13 seconds has already elapsed since the beginning of the counting operation by the counter (CJAS). At t12, the value in the counter (CJAS) is equal to "1", and the determination condition of step 108 is not satisfied. Then, the CPU 26 does not execute any operation, and terminates the routine.

One reason for terminating the routine when the value in the counter (CJAS) is less than "2" will be given hereafter. As 0.065 seconds has not elapsed yet since the engine became diagnosable, the value in the counter (CJAS) is unidentifiable, i.e. whether it is "0" or "1". Hence, when it is certain that the value in the counter (CJAS) has become greater than "1" (in other words, when the counter (CJAS) has performed the counting operation at least twice), the CPU 26 advances to the next step.

When the determination condition at step 108 is satisfied (i.e., t3 in FIG. 6), the CPU 26 starts executing the diagnostic operation. The CPU 26 interrupts the operation for calculating a mean value (FAFAV) of the feedback correction factors (FAF) (step 109). After this interruption, the mean value (FAFAV) calculated just before t3 will be utilized as a mean value.

Further, the CPU 26 transmits a signal in order to energize the solenoid 45a of the VSV 45 (step 110). Therefore, the lead passage 51 is opened, such that the second chamber 502 communicates with the intake passage 2. The internal pressure of the second chamber 502 decreases, and the valve piece 48 is released. The intake passage 2 thus communicates with the exhaust passage 3. The air in the intake passage 2 is led into the exhaust manifolds 12 as the secondary air.

The CPU 26 changes the integral capacity (KI) of the feedback correction factor (FAF) in order to shorten the execution time of the diagnostic routine (step 111). According to this embodiment, the CPU 26 changes the value of the integral capacity (KI) to "1.5 (%/sec)", in order to make it larger than that of KI used before t3.

The CPU 26 determines whether or not the value in the diagnosis execution counter (CJAS) is at least "15" (step 112). In other words, the CPU 26 determines whether or not approximately one second has elapsed since the secondary air supply has started. At t3, the value in the counter (CJAS) is "2", and the condition at step 112 is not satisfied. Then, the CPU 26 does not execute further operations, and terminates this routine.

As the above described operations are repeatedly executed, the value in the counter (CJAS) is increased by "1", at step 107. When the secondary air supplier 41 is properly functioning, and the exact amount of the secondary air is supplied to the exhaust manifolds 12, the air-fuel ratio (A/F) tends to indicate a lean condition, caused by the supplied secondary air. Consequently, as shown by a solid line in FIG. 6, the feedback correction factor (FAF) is increased by several times the value (KI), in order to approach the theoretical air-fuel ratio. The condition at step 112 (i.e. CJAI $\geq$ 15) is satisfied at t4, and the CPU 26 interrupts the skipping operation for calculating a feedback correction factor (FAF).

The CPU 26 calculates a deviation ($\Delta$FAF) between the present feedback correction factor (FAF) and the mean value (FAFAV) of FAF at step 109. Then, the CPU 26 determines whether or not the deviation ($\Delta$FAF) is at least a predetermined value ($\alpha$) (step 114). When the deviation ($\Delta$FAF) is at least the predetermined value ($\alpha$) ($\Delta$FAF$\geq\alpha$), the CPU 26 determines that the secondary air supplier 41 is properly functioning (step 116).

The CPU 26 sets the diagnosis completion flag (XJASE) to "1", in order to terminate the diagnostic routine (step 118), and starts executing step 119. That is, the CPU 26 sets the value in the diagnosis execution counter (CJAS) to "0" (step 119). The CPU 26 transmits a signal to the solenoid 45a, in order to de-energize it (step 120), and terminates this routine. Therefore, the passage 42 is blocked by the valve piece 48, such that the secondary air is no longer fed into the exhaust manifolds 12. The feedback control for the air-fuel ratio (A/F) is resumed. During this feedback control operation, the mean value (FAFAV) of the previous feedback correction factor (FAF) is utilized.

When the operation of step 110 is executed at t3, if the secondary air supplier 41 is malfunctioning, the amount of secondary air supplied to the exhaust manifolds 12 becomes smaller than that during the normal condition. The air-fuel ratio (A/F) at this time does not become as lean as that indicated when the secondary air supplier 41 is properly functioning.

The CPU 26 determines that the A/F ratio indicates a change from the lean condition to the rich condition, at t4a in FIG. 6. At this time, the skipping operation for the feedback correction factor (FAF) is interrupted at step 113. As a result, the feedback correction factor FAF is decreased by several times the value KI (KI=1.5) (indicated by a double dotted line in FIG. 6). This decrement is kept executing, until the air-fuel ratio (A/F) changes its condition from the rich condition to the lean condition.

Therefore, when the secondary air supplier 41 is not properly functioning, the condition of step 114 (i.e, $\Delta FAF \geq \alpha$) is not satisfied (at t4 in FIG. 6). In this case, the CPU 26 advances to step 115, and determines whether or not the value in the counter (CJAS) is equal to, or less than "77". In other words, the CPU 26 determines whether or not approximately five seconds has elapsed since the counter (CJAS) has started its counting operation. This five second period corresponds to the period of time for executing the diagnostic operation. At t4, the value in the counter (CJAS) is "15". Therefore, the condition of step 115 is not satisfied, such that the CPU 26 does not execute any operation, and terminates the routine.

When the air-fuel ratio (A/F) changes its condition from the rich condition to the lean condition (t5 in FIG. 6), the feedback correction factor (FAF) is increased by the value KI (KI=1.5). At the timing t6 when the air-fuel ratio (A/F) changes its condition from the lean condition to the rich condition, this increment is switched to the decrement. Further, at the timing t7 when the air-fuel ratio (A/F) is switched from the rich condition to the lean condition, this switching condition is caused to increment.

When the condition of step 115 is satisfied (at t8 in FIG. 8), the CPU 26 determines that the secondary air supplier 41 is malfunctioning (step 117). In other words, if the condition ($\Delta FAF < \alpha$) lasts for a predetermined period of time (in this case, five seconds), the CPU 26 determines that the secondary air supplier 41 is not properly functioning, and the exact amount of secondary air is therefore not adequately supplied, regardless of the operational signal transmitted from the supplier 41. Then, the CPU 26 diagnoses a malfunction in the supplier 41 (step 117).

The CPU 26 sets the value of the flag (XJASE) to "1", in order to terminate this diagnostic operation (step 118). Further, the CPU 26 sets the value in the diagnosis execution counter (CJAS) to "0" (step 119), and transmits a signal to the solenoid 45a in order to de-energize the solenoid 45a (step 120). The CPU 26 terminates this routine. The passage 42 is shut off by the valve piece 48 of the ASV 44, and the secondary air is prevented from flowing into the exhaust manifolds 12. The feedback control for the air-fuel ratio (A/F), which utilizes the mean value (FAFAV) of the feedback correction factor calculated before the diagnostic operation has been executed, is resumed.

After t8, the value of the flag (XJASE) becomes "1". Thus the condition of step 101 is not satisfied. In this case, the CPU 26 does not execute any operation starting from step 102, and terminates the routine. In other words, the diagnostic operation for diagnosing the condition of the secondary air supplier 41 is executed only once, after the engine 1 is activated.

According to this embodiment, while the feedback control operation for the amount of injected fuel is executed, the secondary air is temporarily supplied to the exhaust passage 3, by activating the secondary air supplier 41 (steps 110, 120). At this time, if the supplier 41 is functioning properly, the exact amount of secondary air is supplied. The air-fuel ratio (A/F) tends to indicate a lean condition, caused by this supply. Therefore, the feedback correction factor (FAF) is significantly increased, in order to approach the theoretical ratio. On the other hand, if the secondary air supplier 41 is not properly functioning, the amount of secondary air supplied to the exhaust passage 3 becomes smaller than the properly determined amount. The air-fuel ratio (A/F) tends to indicate a lean condition, the degree of the lean condition being significantly less than that of the normal condition. Therefore, the increment in the feedback correction factor (FAF) of the malfunctioning condition is less than the increment of the normal condition.

According to this embodiment, a deviation value ($\Delta FAF$) is calculated between the mean value (FAFAV) of the feedback correction factor (FAF) before the secondary air supply, and the feedback correction factor (FAF) after the secondary air supply. When the deviation value ($\Delta FAF$) is smaller than the predetermined value ($\alpha$), the CPU 26 determines that the secondary air supplier 41 is not functioning properly (steps 114 through 117).

Therefore, in the diagnostic operation according to this embodiment, the fundamental value "1.0" for the feedback correction factor (FAF) is not utilized to diagnose the operational condition of the secondary air supplier 41. The condition of the supplier 41 is diagnosed, based on the deviation value ($\Delta FAF$) calculated between the feedback correction factors (FAF) before and after the secondary air supply, instead of the fundamental value.

The feedback correction factor (FAF) may largely shift from the fundamental value, when the vehicle is decelerating. Under this condition, even if the secondary air is supplied, the diagnostic operation is not influenced by the change in the feedback correction factor (FAF). Consequently, the diagnostic operation is accurately executed.

Furthermore, according to this embodiment, as described above, the diagnostic operation is executed, based on the deviation value ($\Delta FAF$) of the feedback correction factor (FAF) after the secondary air has been supplied, against the mean value (FAFAV) of the feedback correction factors (FAF) before the secondary air has been supplied. Thus, there is no need to calculate a mean value (FAFAV) of the feedback correction factor (FAF) for use in the execution of the diagnostic operation after the secondary air has been supplied. Therefore, the execution time for diagnosing the condition can be shortened by the time of the above-described calculation.

According to this embodiment, the operation which switches a value of the integral capacity (KI) for calculating the feedback correction factor (FAF) with a large value is introduced (step 111). Furthermore, the skipping operation can be executed only after the diagnostic operation has been executed. (step 113). Therefore, the time for executing the diagnostic operation can be shortened, by the above-described operations.

Accordingly, shortening the diagnostic operation executing time causes the exhaust characteristic of the vehicle to improve. While the secondary air is supplied, the air-fuel ratio (A/F) within the manifolds 12 approaches the theoretical ratio, by means of the feedback control for the amount of fuel injected. However, the air-fuel ratio (FAF) within the combustion chamber becomes rich, and carbon monoxide (CO) and hydrocarbon (HC) are increased. It is desirable to shorten the supply time for the secondary air while the feedback control is executed, with respect to improving the exhaust characteristic. The diagnostic operation according to this embodiment can shorten the execution time, such that increase in the hydro-carbon (HC) and carbon-monoxide (CO) amount can be prevented.

Although only one embodiment of the present invention has been described herein, it should be apparent to those skilled in the art that the present invention may be embodied in many other specific forms without departing from the spirit or scope of the invention.

For example, although this embodiment relates to an engine having four cylinders, the number of cylinders is not an essential factor of the present invention. A vehicle having the diagnostic system according to the present invention can be provided with a warning light disposed in the instrument panel of the vehicle. The warning light warns a driver of abnormal conditions of the secondary air supplier 41.

Therefore, the present examples and embodiments are to be considered as illustrative and not restrictive, and the invention is not to be limited to the details giving herein, but may be modified within the scope of the appended claims.

What is claimed is:

1. A diagnostic system for a secondary air supplier in an engine, the engine including a cylinder; an intake passage; an exhaust passage; an injector for injecting fuel into one of the cylinder and the intake passage; a sensor for detecting an air-fuel ratio (A/F) of the exhaust gas within the exhaust passage; an engine controller for executing feedback control of an amount of fuel injected by the injector, in such a way that the air-fuel ratio (A/F) approaches a theoretical air-fuel ration, wherein the amount of fuel injected is a function of a changeable feedback correction factor (FAF); and wherein the engine controller is equipped with a memory unit for changing and storing the value of the feedback correction factor (FAF), the secondary air supplier including an air supply unit for supplying secondary air from the intake passage to the exhaust passage, so that the secondary air mixes with existing exhaust gas to change the air-fuel ratio of the exhaust gas; a detection unit for detecting a condition of the engine; and a control unit for controlling the air supply unit in accordance with the engine condition, whereby the secondary air is supplied to the exhaust passage by means of the air supply unit when the engine is in a predetermined condition in which the engine controller interrupts the feedback control of the amount of the fuel injected, the diagnostic system comprising:

command means for instructing the secondary air supplier to temporarily supply air to the exhaust passage when the engine controller executes the feedback control of the amount of fuel injected;

sampling means for sampling the changeable feedback correction factor (FAF) from the memory unit, said sampling means detecting a first feedback correction factor before the secondary air is supplied based on the instruction of said command means, and a second feedback correction factor after the secondary air has been supplied;

calculation means for calculating a deviation value ($\Delta$FAF) between said first and said second feedback correction factors; and diagnostic means for determining that the secondary air supplier is malfunctioning when said deviation value is smaller than a predetermined value ($\alpha$).

2. The diagnostic system according to claim 1, wherein the engine controller executes the feedback control of an amount of fuel injected by the injector in accordance with a mean value (FAFAV) of several feedback correction factors (FAF); and wherein said mean value (FAFAV) is used as said first feedback correction factor.

3. The diagnostic system according to claim 1, wherein the secondary air supplier includes:

a passage for connecting the intake passage and the exhaust passage; the engine is in a predetermined condition in which the engine controller interrupts the feedback control of the amount of the fuel injected, the method comprising the steps of:

A. determining whether the engine is in a predetermined condition suitable for diagnosing the secondary air supplier;

B. instructing the secondary air supplier to temporarily supply air to the exhaust passage, when the engine is in said predetermined condition suitable for diagnosis, and when the engine controller executes the feedback control of the amount of the fuel injected;

C. detecting a first feedback correction factor before the secondary air is supplied to the exhaust passage, based on said instruction;

D. detecting a second feedback correction factor after the secondary air has been supplied to the exhaust passage, based on said instruction;

E. calculating a deviation value ($\Delta$FAF) between said first and said second feedback correction factors; and F. determining that the secondary air supplier is malfunctioning, when said deviation value ($\Delta$FAF) is smaller than a predetermined value ($\alpha$).

4. A method for diagnosing a secondary air supplier in an engine, the engine including a cylinder; an intake passage; an exhaust passage; an injector for injecting fuel into one of the cylinder and the intake passage; a sensor for detecting an air-fuel ratio (A/F) of the exhaust gas within the exhaust passage; an engine controller for executing feedback control of an amount of fuel injected by the injector, in such a way that the air-fuel ratio (A/F) approaches a theoretical air-fuel ratio, wherein the amount of fuel injected is a function of a changeable feedback correction factor (FAF); and wherein the engine controller is equipped with a memory unit for changing and storing the value of the feedback correction factor (FAF), the secondary air supplier including an air supply unit for supplying secondary air from the intake passage to the exhaust passage, so that the secondary air mixes with existing exhaust gas; to change the air-fuel ration of the exhaust gas; a detection unit for detecting a condition of the engine; and a control unit for controlling the air supply unit in accordance with the engine condition, whereby the secondary air is supplied to the exhaust passage by means of the air supply unit when the engine is in a predetermined condition in which the engine controller interrupts the feedback control of the amount of fuel injected, the method comprising the steps of:

A. determining whether the engine is in a predetermined condition suitable for diagnosing the secondary air supplier;

B. instructing the secondary air supplier to temporarily supply air to the exhaust passage, when the engine is in said predetermined condition suitable for diagnosis, and when the engine controller executes the feedback control of the amount of fuel injected;

C. detecting a first feedback correction factor before the secondary air is supplied to the exhaust passage, based on said instruction;

D. detecting a second feedback correction factor after the secondary air has been supplied to the exhaust passage, based on said instruction;

E. calculating a deviation value ($\Delta$FAF) between said first and said second feedback correction factors; and F. determining that the secondary air supplier is malfunctioning when said deviation value is smaller than a predetermined value ($\alpha$).

5. The method according to claim 4, wherein the engine controller executes the feedback control of an amount of the fuel injected by the injector in accordance with a mean value (FAFAV) of several feedback correction factors (FAF); and wherein said mean value (FAFAV) is used as said first feedback correction factor.

6. The method according to claim 4, wherein the secondary air supplier includes:

a passage for connecting the intake passage and the exhaust passage;

switch means provided along said passage, for switching between a first position, where air is allowed to flow along said passage, and a second position, where air is prohibited from flowing along said passage; and valve means for controlling said switch means.

* * * * *

UNITED STATES PATENT AND TRADEMARK OFFICE
CERTIFICATE OF CORRECTION

PATENT NO. : 5,325,663
DATED : July 5, 1994
INVENTOR(S) : Tokiji Itoh

It is certified that error appears in the above-indentified patent and that said Letters Patent is hereby corrected as shown below:

| Column | Line | |
|---|---|---|
| 1 | 57 | After "wherein" insert --the vehicle is decelerating--. |
| 2 | 29 | After "vary" insert --,--; after "specifically" delete ",". |
| 3 | 20 | Change "con, hands" to --commands--. |
| 3 | 22 | After "passage" delete ",". |
| 4 | 11 | Change "cheers" to --chambers--. |
| 4 | 15 | Change "the down side" to --an upstream--. |
| 4 | 39 | Change "Spark" to --spark--. |

UNITED STATES PATENT AND TRADEMARK OFFICE
CERTIFICATE OF CORRECTION

PATENT NO. : 5,325,663
DATED : July 5, 1994
INVENTOR(S) : Tokiji Itoh

It is certified that error appears in the above-indentified patent and that said Letters Patent is hereby corrected as shown below:

| Column | Line | |
|---|---|---|
| 5 | 64 | Change "field" to --fluid--. |
| 6 | 35 | Change "RAM29" to --RAM 29--. |
| 13 | 49 | Change "ration," to --ration;-- |
| 14 | 29-54 | After "exhaust passage" delete the remainder of this claim and replace with --switch means provided along said passage, for switching between a first position, where air is allowed to flow along said passage, and a second position, where air is prohibited from flowing along said passage; and valve means for controlling said switch means.-- |

UNITED STATES PATENT AND TRADEMARK OFFICE
CERTIFICATE OF CORRECTION

PATENT NO. : 5,325,663
DATED : July 5, 1994
INVENTOR(S) : Tokiji Itoh

It is certified that error appears in the above-indentified patent and that said Letters Patent is hereby corrected as shown below:

| Column | Line | |
|---|---|---|
| 14 | 63 | After "ratio" change "," to --;--. |
| 15 | 4 | After "gas" delete ";". |

Signed and Sealed this

Twenty-ninth Day of November, 1994

Attest:

BRUCE LEHMAN

Attesting Officer    Commissioner of Patents and Trademarks